(12) United States Patent
Tolbert et al.

(10) Patent No.: US 10,943,088 B2
(45) Date of Patent: Mar. 9, 2021

(54) VOLUMETRIC MODELING TO IDENTIFY IMAGE AREAS FOR PATTERN RECOGNITION

(71) Applicant: Target Brands, Inc., Minneapolis, MN (US)

(72) Inventors: Donnie Scott Tolbert, Minneapolis, MN (US); Michael Tyler Ahlm, Arden Hills, MN (US)

(73) Assignee: Target Brands, Inc., Minneapolis, MN (US)

( * ) Notice: Subject to any disclaimer, the term of this patent is extended or adjusted under 35 U.S.C. 154(b) by 183 days.

(21) Appl. No.: 16/002,418

(22) Filed: Jun. 7, 2018

(65) Prior Publication Data
US 2018/0365481 A1 Dec. 20, 2018

Related U.S. Application Data

(60) Provisional application No. 62/519,523, filed on Jun. 14, 2017.

(51) Int. Cl.
*G06K 9/00* (2006.01)

(52) U.S. Cl.
CPC ..... *G06K 9/00201* (2013.01); *G06K 9/00288* (2013.01); *G06K 9/00335* (2013.01); *G06K 9/00362* (2013.01); *G06K 9/00664* (2013.01); *G06K 2209/40* (2013.01)

(58) Field of Classification Search
CPC .......... G06K 9/00288; G06K 9/00335; G06K 9/00362; G06K 2209/40; G06K 9/00201; G06K 9/00664
See application file for complete search history.

(56) References Cited

U.S. PATENT DOCUMENTS

| | | | |
|---|---|---|---|
| 7,257,237 B1 | 8/2007 | Luck et al. |
| 7,355,598 B2 | 4/2008 | Yang et al. |
| 7,483,049 B2 | 1/2009 | Aman et al. |
| 7,576,737 B2 | 8/2009 | Fujiwara et al. |
| 7,801,332 B2 | 9/2010 | Albertson et al. |
| 7,930,204 B1 | 4/2011 | Sharma et al. |
| 7,957,565 B1 | 6/2011 | Sharma et al. |

(Continued)

FOREIGN PATENT DOCUMENTS

| | | |
|---|---|---|
| CN | 101789126 A | 7/2010 |
| WO | 2006030444 A2 | 3/2006 |

OTHER PUBLICATIONS

Banerjee et al., Human Motion Detection and Tracking for Video Surveillance, retrieved from http://www.ncc.org.in/download.php?f=NCC2008/2008_A3_1.pdf . Publication date via Researchgate: https://www.researchgate.net/publication/228861429_Human_motion_detection_and_tracking_for_video_surveillance, 5 pages, 2008.

(Continued)

*Primary Examiner* — Margaret G Mastrodonato
(74) *Attorney, Agent, or Firm* — Theodore M. Magee; Westman, Champlin & Koehler, P.A.

(57) ABSTRACT

A computer-implemented method performs volumetric modeling of objects in a space captured by a plurality of cameras to determine which of a plurality of camera images contains an image that facilitates pattern recognition. The camera images that contain an image that facilitates pattern recognition are then used to perform pattern recognition.

19 Claims, 14 Drawing Sheets

(56) References Cited

U.S. PATENT DOCUMENTS

| | | |
|---|---|---|
| 7,961,910 B2 | 6/2011 | Lee et al. |
| 7,974,869 B1 | 7/2011 | Sharma et al. |
| 7,987,111 B1 | 7/2011 | Sharma et al. |
| 8,059,153 B1 | 11/2011 | Barreto et al. |
| 8,098,888 B1 | 1/2012 | Mummareddy et al. |
| 8,180,112 B2 | 5/2012 | Kurtz et al. |
| 8,195,499 B2 | 6/2012 | Angell et al. |
| 8,295,542 B2 | 10/2012 | Albertson et al. |
| 8,295,597 B1 | 10/2012 | Sharma et al. |
| 8,401,242 B2 | 3/2013 | Newcombe et al. |
| 8,452,052 B2 | 5/2013 | Erignac |
| 8,463,006 B2 | 6/2013 | Prokoski |
| 8,471,848 B2 | 6/2013 | Tschesnok |
| 8,542,910 B2 | 9/2013 | Leyvand et al. |
| 8,547,437 B2 | 10/2013 | Buehler et al. |
| 8,560,357 B2 | 10/2013 | Sickenius |
| 8,564,534 B2 | 10/2013 | Leyvand et al. |
| 8,890,937 B2 | 11/2014 | Skubic et al. |
| 9,033,238 B2 | 5/2015 | Davis |
| 9,058,663 B2 | 6/2015 | Andriluka et al. |
| 9,141,863 B2 | 9/2015 | Rosenkrantz |
| 9,177,195 B2 | 11/2015 | Marcheselli et al. |
| 9,247,211 B2 | 1/2016 | Zhang et al. |
| 9,396,640 B2 | 7/2016 | Fishwick |
| 9,400,941 B2 | 7/2016 | Kurz et al. |
| 9,407,878 B2 | 8/2016 | Buehler |
| 9,525,862 B2 | 12/2016 | Benhimane et al. |
| 9,544,489 B2 | 1/2017 | Laforte et al. |
| 2003/0161505 A1 | 8/2003 | Schrank |
| 2004/0130620 A1* | 7/2004 | Buehler ............ G06K 9/00335 348/143 |
| 2007/0253598 A1* | 11/2007 | Yuasa ................ G06K 9/00255 382/104 |
| 2012/0075464 A1 | 3/2012 | Derenne et al. |
| 2012/0128208 A1* | 5/2012 | Leyvand ................ G06K 9/469 382/103 |
| 2013/0343600 A1* | 12/2013 | Kikkeri ............ G06K 9/00295 382/103 |
| 2014/0043329 A1 | 2/2014 | Wang et al. |
| 2014/0226855 A1 | 8/2014 | Savvides et al. |
| 2014/0368504 A1 | 12/2014 | Chen et al. |
| 2015/0025936 A1 | 1/2015 | Garel et al. |
| 2015/0036883 A1 | 2/2015 | Deri et al. |
| 2015/0039458 A1 | 2/2015 | Reid |
| 2015/0095189 A1 | 4/2015 | Dharssi et al. |
| 2015/0123968 A1 | 5/2015 | Holverda et al. |
| 2016/0063821 A1 | 3/2016 | MacIntosh et al. |
| 2016/0189170 A1 | 6/2016 | Nadler et al. |
| 2016/0253735 A1 | 9/2016 | Scudillo et al. |
| 2016/0275356 A1* | 9/2016 | Kuwahara ........ G08B 13/19669 |
| 2016/0364634 A1 | 12/2016 | Davis et al. |
| 2017/0004649 A1 | 1/2017 | Collet Romea et al. |
| 2018/0039745 A1* | 2/2018 | Chevalier ............. G16H 30/40 |

OTHER PUBLICATIONS

Ali et al., Multiple Human Tracking in High-Density Crowds, Retrieved from http://www.cs.ait.ac.th/vgl/irshad/OldSite/data/acivs09.pdf, 11 pages, 2012.

Mikic et al., Human Body Model, retrieved from http://code.ucsd.edu/pcosman/amdo.pdf, 15 pages, 2017.

Plankers et al., Tracking and Modeling, retrieved from http://luthuli.cs.uiuc.edu/~daf/courses/appcv/papers/ankers01tracking.pdf, 17 pages, 2017.

Sinha et al., Development of Human Tracking system for Video Surveillance, retrieved from http://airccj.org/CSCP/vol1/csit1317.pdf, 9 pages, 2011.

Kehl et al., Markerless Tracking of Complex Human Motions from Multiple Views, retrieved from https://www.researchgate.net/profile/Luc_Van_Gool/publication/220135265_Markerless_tracking_of_complex_human_motions_from_multiple_views/links/57224ca908ae262228a5e9ca.pdf, 20 pages, 2006.

Petrushin et al., Multiple-camera people localization in an indoor environment, Knowledge and Information Systems, vol. 10, No. 2, pp. 229-241, 2006.

* cited by examiner

US 10,943,088 B2

VOLUMETRIC MODELING TO IDENTIFY IMAGE AREAS FOR PATTERN RECOGNITION

CROSS-REFERENCE TO RELATED APPLICATION

The present application is based on and claims the benefit of U.S. provisional patent application Ser. No. 62/519,523, filed Jun. 14, 2017, the content of which is hereby incorporated by reference in its entirety.

BACKGROUND

In pattern recognition, objects and people are identified in images by extracting various features from the images and comparing the extracted features to stored features for known objects and people. One challenge in such system is identifying which portion of the image contains the object or person to be recognized.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method performs volumetric modeling of objects in a space captured by a plurality of cameras to determine which of a plurality of camera images contains an image that facilitates pattern recognition. The camera images that contain an image that facilitates pattern recognition are then used to perform pattern recognition.

In accordance with a further embodiment, a method includes receiving an indication from a volumetric recognition system that a new person has been recognized in a space and using at least one camera image used by the volumetric recognition system as input to an alternative recognition system to determine that the volumetric recognition system erroneously identified the person as new. An identifier that was previously set for the person when the person was initially recognized in the space is then provided.

In a still further embodiment, a recognition system includes a plurality of cameras distributed throughout a building and a volumetric recognition system that identifies people in the building based on intersections of 3-dimensional projections that are generated from images captured by the plurality of cameras. The volumetric recognition system further identifies which of a plurality of images captured by the plurality of cameras contains particular body areas of people. An alternative pattern recognition system identifies people using images identified by the volumetric recognition system as containing the particular body areas of people.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The embodiments described below use volumetric modeling of objects in a building to identify portions of camera images that would be useful during pattern recognition. For example, one embodiment uses volumetric modeling to identify a region of a camera image that will contain a face. This region of the camera image is then provided to a facial recognition system to link the image to an identifier for a person.

Figure 1:
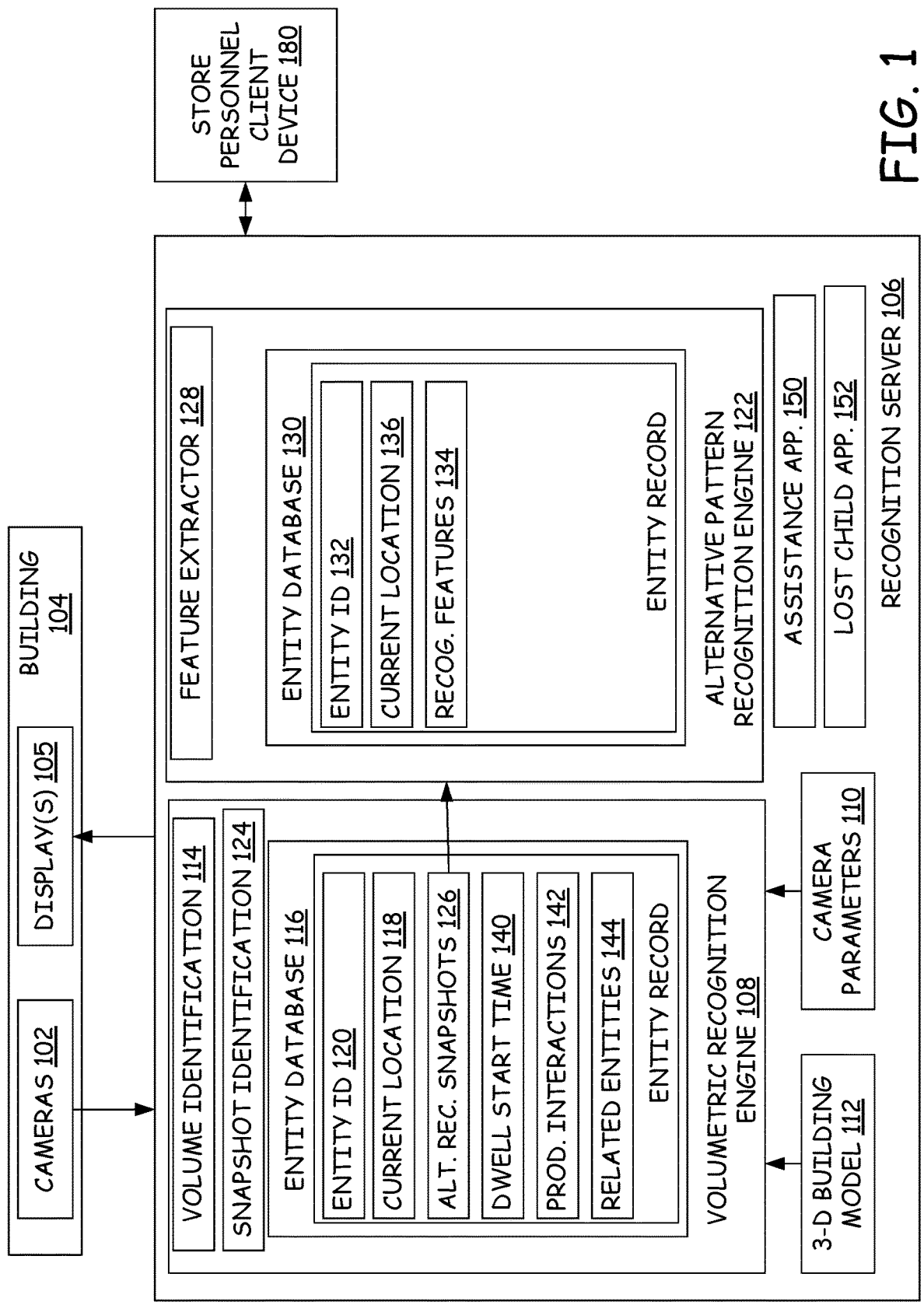
FIG. 1 is a block diagram of a recognition system in accordance with one embodiment.

FIG. 1 provides a block diagram of a system 100 used to track and identify people within a building. In embodiments where personal privacy is important, the identification of people involves associating a unique identifier with each person where the unique identifier does not contain any personal information about the person. For example, the unique identifier can be a randomly chosen 32-bit number.

In system 100, a collection of cameras 102 that are distributed within a building 104, provide frames of images to a recognition server 106. In accordance with one embodiment, each frame from each camera is timestamped such that frames collected at the same time by different cameras can be grouped together. The frames of images are provided to a volumetric recognition engine 108 together with a set of camera parameters 110 and a 3-Dimensional building model 112. 3-Dimensional building model 112 describes the 3-Dimensional space occupied by the building such that objects in the building have associated 3-Dimensional locations within the space. In accordance with some embodiments, 3-Dimensional building model 112 includes descriptions of physical features in the building such as the size and location of shelves, electronic displays, aisles, point of sale registers, registry kiosks, bathrooms, and exits, for example. Camera parameters 110 describe the 3-D position and orientation of each of cameras 102 within the space defined by 3-D building model 112.

Figure 2:
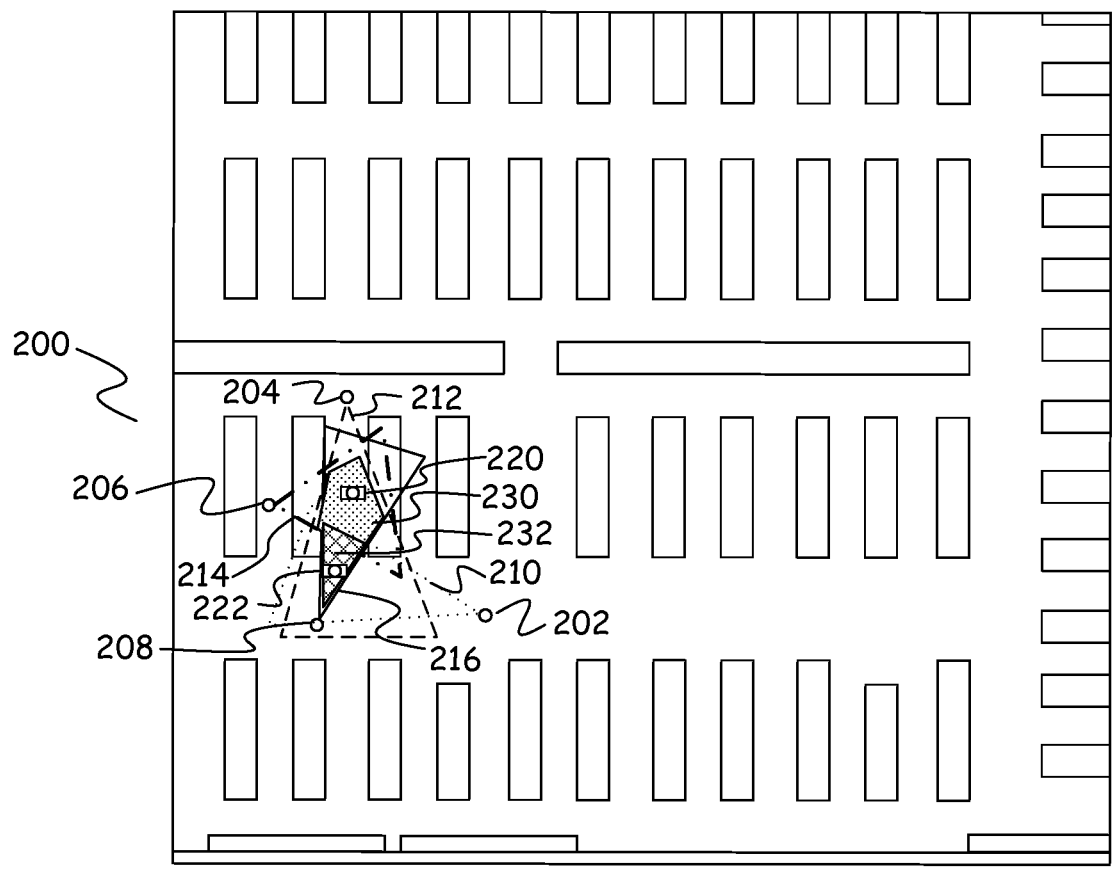
FIG. 2 is a top view of a building showing the placement of a plurality of cameras.

FIG. 2 provides a top view of a building 200 showing the location of four cameras 202, 204, 206, and 208, each having a respective field of view 210, 212, 214 and 216. Two people 220 and 222 are positioned in building 200 and are each within the fields of view of multiple cameras. An area within a field of view of multiple cameras is designated as a zone such as zones 230 and 232, which are shown as shaded areas in FIG. 2. Different zones are within the field of view of different combinations of cameras. In accordance with one embodiment, every position within building 200 is within the field of view of at least three cameras and each zone within building 200 overlaps at least one other zone such that as a person or object leaves one zone, they are already within another zone. This allows a person or object to be tracked as it moves through building 200.

Figure 3:
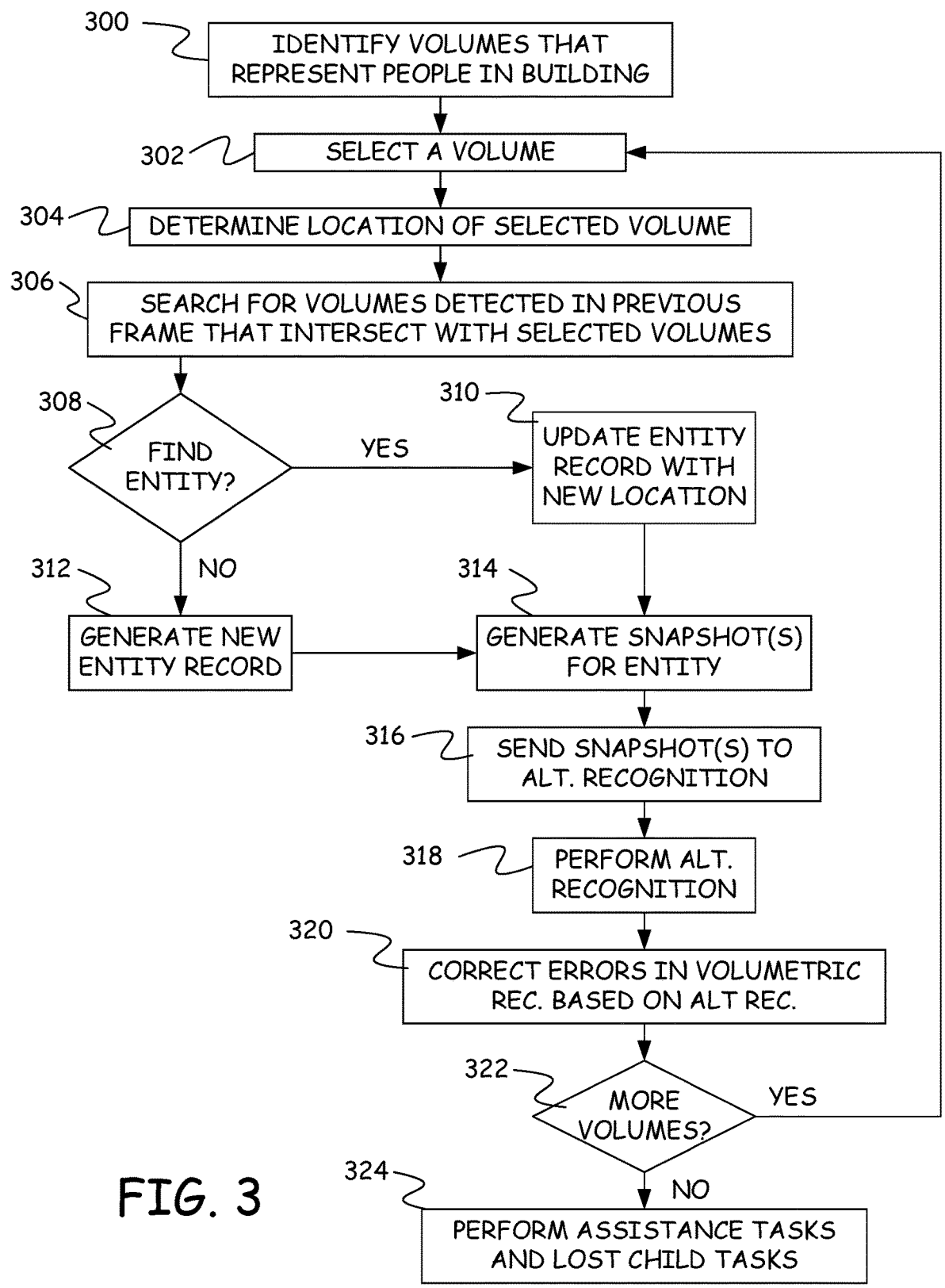
FIG. 3 is a flow diagram for using volumetric modeling in accordance with one embodiment.

FIG. 3 provides a flow diagram for correcting volumetric recognition errors so that recognized volumetric entities can be used to assist people in a building. In step 300, volumetric recognition engine 108 identifies volumes in building 104 that represent people. In accordance with one embodiment, this volumetric recognition is performed by a Volume Identification Application 114 using a method shown in the flow diagram of FIG. 4.

Figure 4:
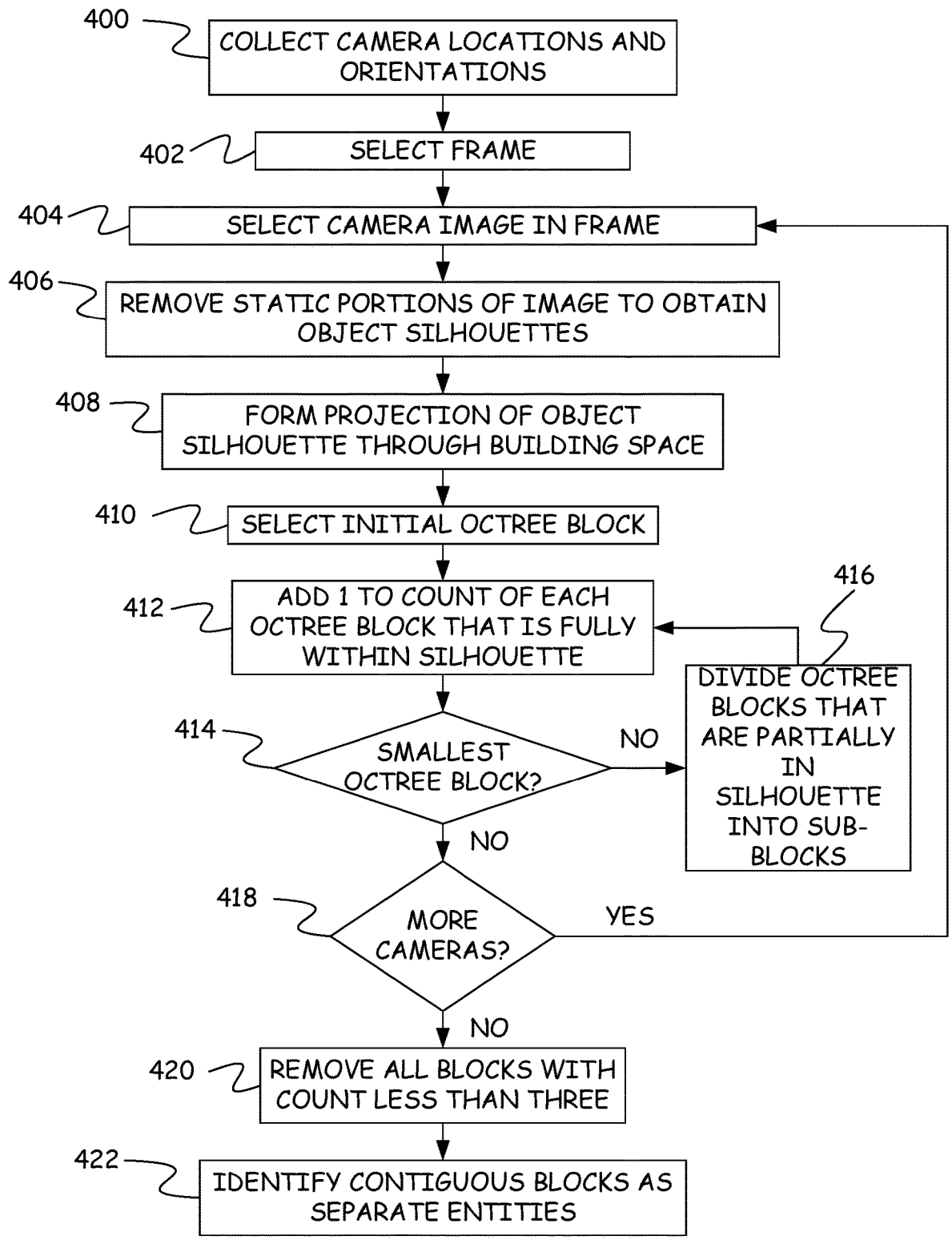
FIG. 4 is a flow diagram for performing volumetric modeling to identify volumes representing people in a building.

In step 400 of FIG. 4, volume identification 114 receives the camera locations and orientations of camera parameters 110. Volume identification 114 then selects a frame of camera images to process at step 402. A frame of camera images represents a collection of camera images with one image from each camera 102, where each camera image was recorded at substantially the same point in time. Thus, selecting the frame involves selecting a point in time and requesting camera images from each camera for that point in time.

At step 404, volume identification 114 selects one camera image in the selected frame of camera images and at step 406, volume identification 114 removes static portions of the image to obtain an object silhouette for objects that are moving between the frames of images from the camera. The static portions can be identified by comparing the image from the current frame of the camera to an image from a past frame within volume identification 114 or can be identified by cameras 102, which then send the boundary of the moving objects when the image is sent to volumetric recognition engine 108. In accordance with some embodiments, the moving objects are limited to parts of a person using a person tracking model such as a histogram of oriented gradients or a neural network, which can be implemented on one of cameras 102 or in volume identification 114. By having cameras 102 perform the moving object/person identification in each image, the embodiments are better able to scale since the moving object/person identification is distributed across each camera instead of being performed at a common server.

Figure 5:
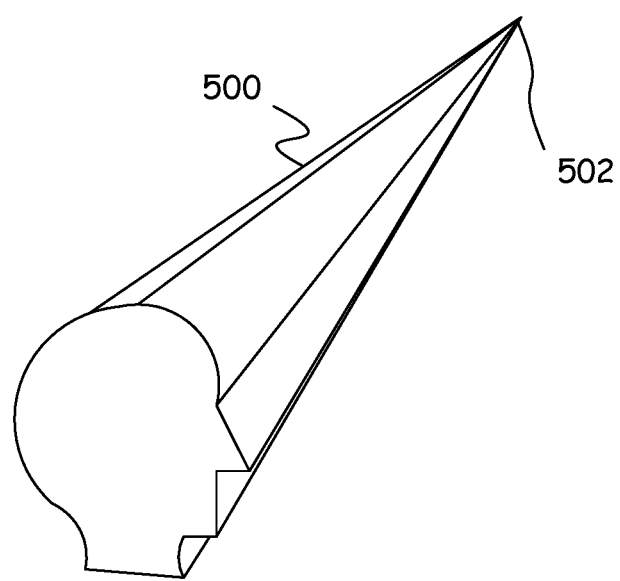
FIG. 5 shows a three-dimensional projections of a silhouette in accordance with one embodiment.

At step 408, volume identification 114 forms a projection of the silhouette through the 3-Dimensional space of the building. FIG. 5 provides an example of such a projection 500 for a silhouette of a head. The projection is formed by modeling the camera is having a pinpoint opening and reprojecting the image of the silhouette that appeared on the sensors of the camera back through the pinpoint opening and out into the 3-Dimensional space of building model 112. The direction and location of this reprojection is controlled by the orientation and location of the camera stored in camera parameters 110.

Figure 6:
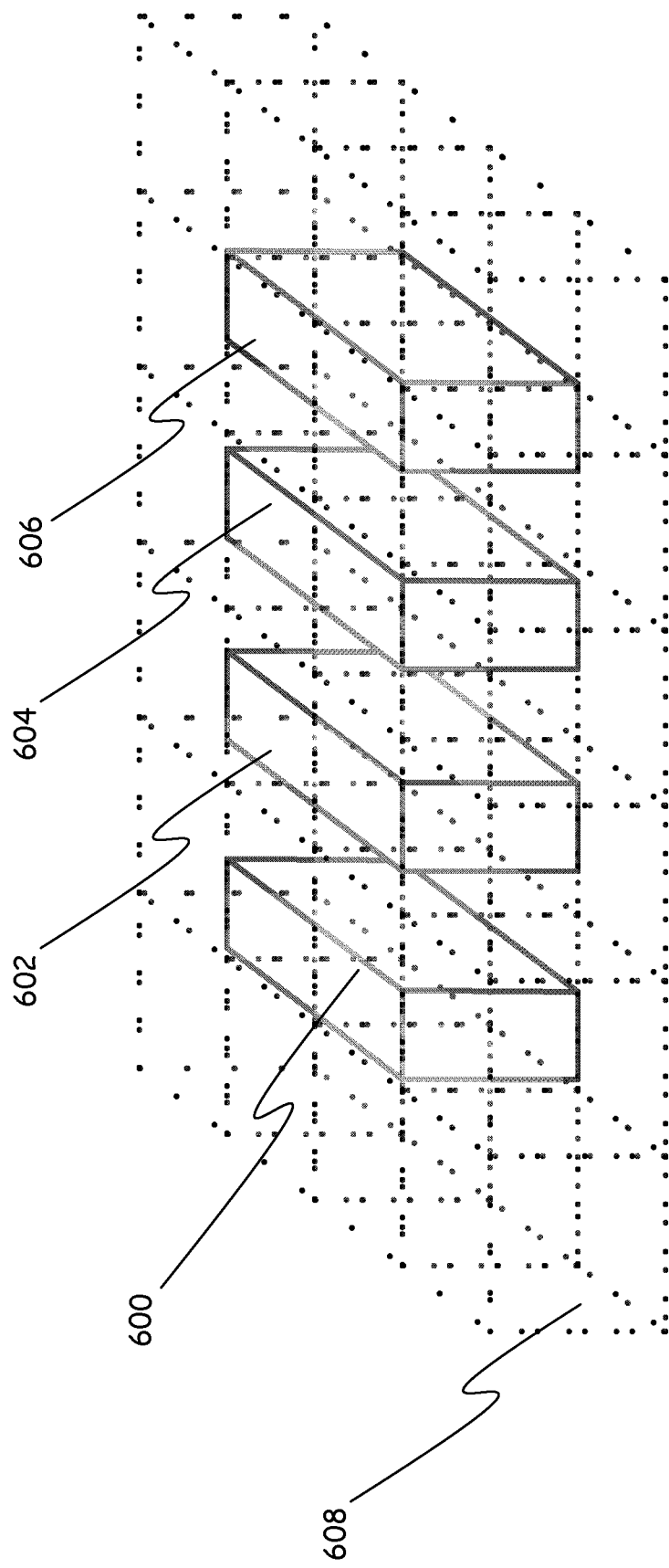
FIG. 6 shows a portion of a 3-D model of a building with octree blocks.
Figure 7:
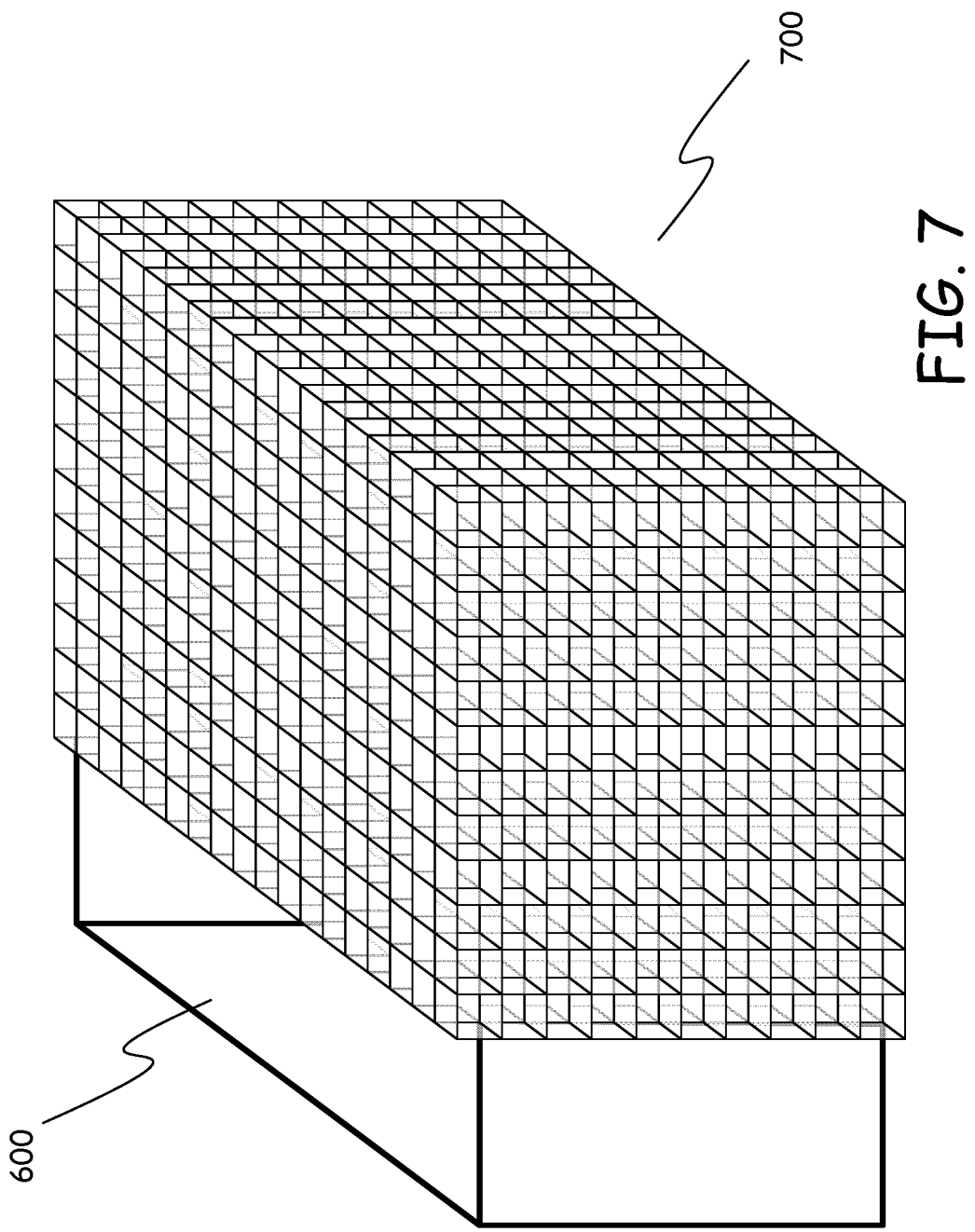
FIG. 7 shows an expanded portion of FIG. 6 showing smaller octree blocks.

In accordance with one embodiment, the volumetric modeling is performed by describing the 3-Dimensional space of building model 112 using an octree data structure. In an octree, the entire building is represented as being enclosed within a single square block. This block is then divided into eight sub-blocks, and each of the eight sub-blocks is divided into eight smaller sub-blocks and so forth until a minimum sized block is obtained. Thus, each point with building model 112 can be described by the hierarchy of blocks that it is located within. FIG. 6 shows a portion of building model 112 with shelves 600, 602, 604 and 606, and a set of blocks for the octree shown in dotted lines, such as block 608. FIG. 7 shows an expanded view of a portion of FIG. 6 showing the octree blocks of FIG. 6 further divided into smaller octree blocks 700. Because the entire building is within the highest level octree block, all of the locations within building model 112 are tied together such that as an object moves within building 104 and between different zones of the building, the description of its position is always well defined since the different zones use the same octree description of the building.

The use of the octree data structure to perform volumetric identification begins at step 410 where an initial octree block size is selected. This initial octree block size should be large enough to enclose the largest expected object to be recognized but should not be any larger than absolutely necessary to reduce unnecessary computations. This selection of the initial octree block size is a selection of a level in the octree hierarchy. Using the selected octree block size, volume identification 114 identifies all blocks that are fully inside the silhouette projection at step 412. For each such block, a count of one is added to the block. Increasing the count of a block inherently increases the count of each sub-block within that block. Thus, each of the eight sub-blocks within the block also have their counts increased by one as do all of the sub-blocks of each of those sub-blocks.

At step 414, volume identification 114 determines if the smallest octree block size has been examined. If the smallest octree block size has not been examined, the process continues at step 416 where all blocks that are partially within the silhouette and partially outside of the silhouette are divided into sub-blocks. The process then returns to step 412 to determine which of the sub-blocks are entirely within the silhouette and to increase the count of each such block by 1. Steps 412, 414 and 416 are repeated until the smallest octree block size is examined at step 414.

When the smallest octree block size has been examined at step 414, the process determines if there are more camera images to be processed for the current frame at step 418. If there are more camera images to process, the next camera image is selected by returning to step 404 and steps 406-418 are repeated.

When all of the camera images have been processed at step 418, the process continues at step 420 where, beginning with the top-level block in the octree hierarchy, all blocks that have a count less than three are removed from further consideration. This leaves blocks that are fully within the intersection of silhouettes formed by at least three cameras. The remaining blocks are then examined to identify contiguous blocks that represent individual entities at step 422. For example, groupings of blocks can be compared to one or more templates to identify if the groupings represent a single entity or multiple entities that are next to each other.

Figure 8:
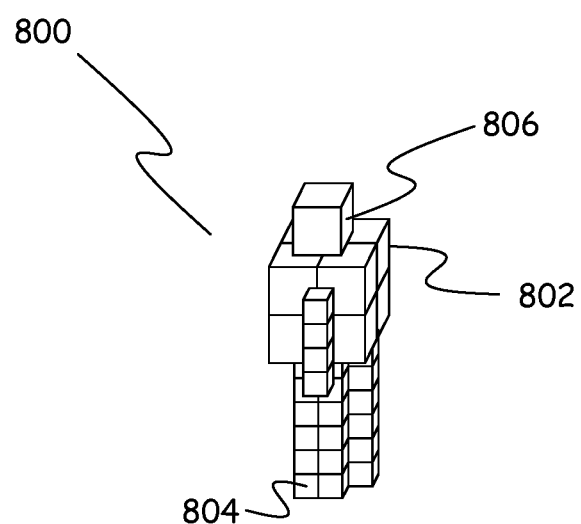
FIG. 8 shows an example of a volume identified through volumetric modeling in accordance with one embodiment.

FIG. 8 provides an example of one grouping 800 of such blocks. In FIG. 8, grouping 800 includes blocks of different sizes, such as block 802 and block 804, indicating that different octree block sizes were found to be within the intersecting silhouettes of at least three cameras.

Returning to FIG. 3, after volumes have been identified that represent people in the building, one of the volumes is selected at step 302 and the location of the selected volume is determined at step 304. A search of an entity database 116 maintained by volumetric recognition engine 108 is then performed at step 306 to look for an existing entity with a volume in the previous frame of camera images that best intersects the current volume. Because of the overlapping zones of camera coverage and the use of a single octree hierarchy for the entire building, the search for intersecting volumes in previous frames implicitly includes examining volumes that were identified in other zones in the previous frames. The single octree hierarchy provides a single frame of reference for all volumes regardless of the zones in which the volumes were detected. As such, the intersections can be determined using the common single octree representation of the volume without requiring a translation that is dependent on the zone in which the volume was found. This speeds up the search for intersecting volumes and allows volumes to be easily tracked as they move between different zones in the building. If an entity's previous volume sufficiently intersects with the current volume at step 308, the entity record in entity database 116 is updated by saving the location of the volume as the current location of the entity 118. In addition, a rolling average location 119 that is the average of the last n locations for the entity is updated based on the newly determined location of the entity. Note that if more than one previous volume intersects with the current volume, volumetric recognition engine 108 selects the previous volume that intersects the current volume to the greatest degree.

If no entities intersect the volume, a new entity record is generated in entity database 116 and is given a new entity ID 120 and a current location 118 that is equal to the location of the volume.

After steps 310 and 312, the process continues at step 314 where volumetric recognition engine 108 generates snapshots of the volume for an alternative pattern recognition engine 122. Alternative pattern recognition engine 122 uses one or more pattern recognition techniques to identify entities from camera images. These techniques can include recognition techniques such as pedestrian detection, clothing recognition, body-shape recognition and facial recognition, for example.

In generating the snapshots of the volume, volumetric recognition engine 108 attempts to identify portions of particular camera images that will be useful for alternative pattern recognition engine 122. For example, when alternative pattern recognition engine 122 is a facial recognition engine, volumetric recognition engine 108 determines which camera image contains a picture of a front view of a person's face and determines what part of the image contains the person's face. When alternative pattern recognition engine 122 is a clothing recognition engine, volumetric recognition engine 108 identifies the camera images that show a person's clothing and designates the areas within the image that contain the clothing.

Figure 9:
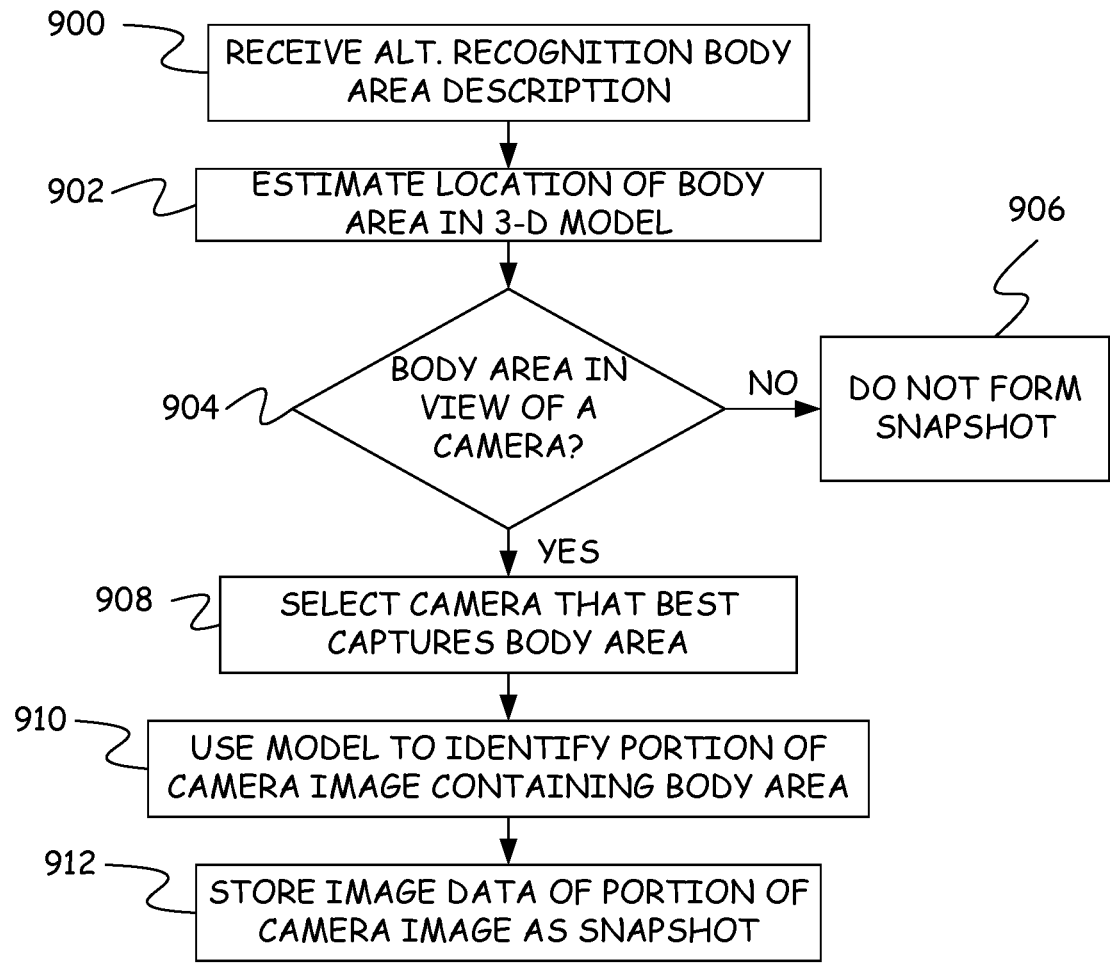
FIG. 9 is a flow diagram of a method for forming snapshots for an alternative pattern recognition engine.

FIG. 9 provides a flow diagram of a method of generating snapshots for alternative pattern recognition engine 122 that is performed by a snapshot generation application 124 of volumetric recognition engine 108. In step 900, snapshot generation application 124 receives a description of the body areas that alternative recognition engine 122 needs when performing recognition. This information can be stored as part of volumetric recognition engine 108 or can be provided to volumetric recognition engine 108 by alternative pattern recognition engine 122 during an initialization process.

At step 902, snapshot generation application 124 estimates the location of the body area on the identified volume. For example, the location of face 806 on volume 800 of FIG. 8 is identified. In accordance with some embodiments, estimating the location of the body area involves performing pattern matching between the volume and a set of stored templates that include identifiers for various body areas. In some embodiments, this matching involves applying scaling and rotation matrices to the volume or templates.

Once the portion of the volume containing the body areas has been identified, snapshot generation 124 determines if the body area is within the view of one of the cameras. This can be done by determining if a line can be drawn from the body area to the camera in the 3-D building model space without intersecting an object in the space. If the body area is not within view of one of the cameras, the process ends at step 906 without a snapshot being formed. If the body area is within the view of one of the cameras, the camera that can see the largest part of the body area is selected at step 908. The volume and the location and orientation of the selected camera are then used to identify the portion of the camera image that contains the body area at step 910. In particular, a virtual image is generated for the camera based on the camera's location and orientation and the location of the body area. The resulting location of the body area in the virtual image is then identified as the portion of the image that contains the body part. The portion of the camera image that was actually captured by the camera and that corresponds to the body area in the virtual image is then selected as the snapshot 126 to provide to alternative pattern recognition engine 122 at step 912.

Returning to FIG. 3, after the snapshot(s) 126 are generated for the entity at step 314, they are provided to alternative pattern recognition engine 122 at step 316. Alternative pattern recognition engine 122 then performs alternative pattern recognition, such as body-shape recognition, on the entity using snapshots 124. Because snapshots 124 are specifically selected because they include the body area required by the alternative pattern recognition, a better recognition is achieved. For example, when body-shape recognition is to be performed, the snapshots will contain mostly images of those portions of the body that make it easier and more efficient to identify the features of the body shape used to distinguish one body shape from another.

Figure 10:
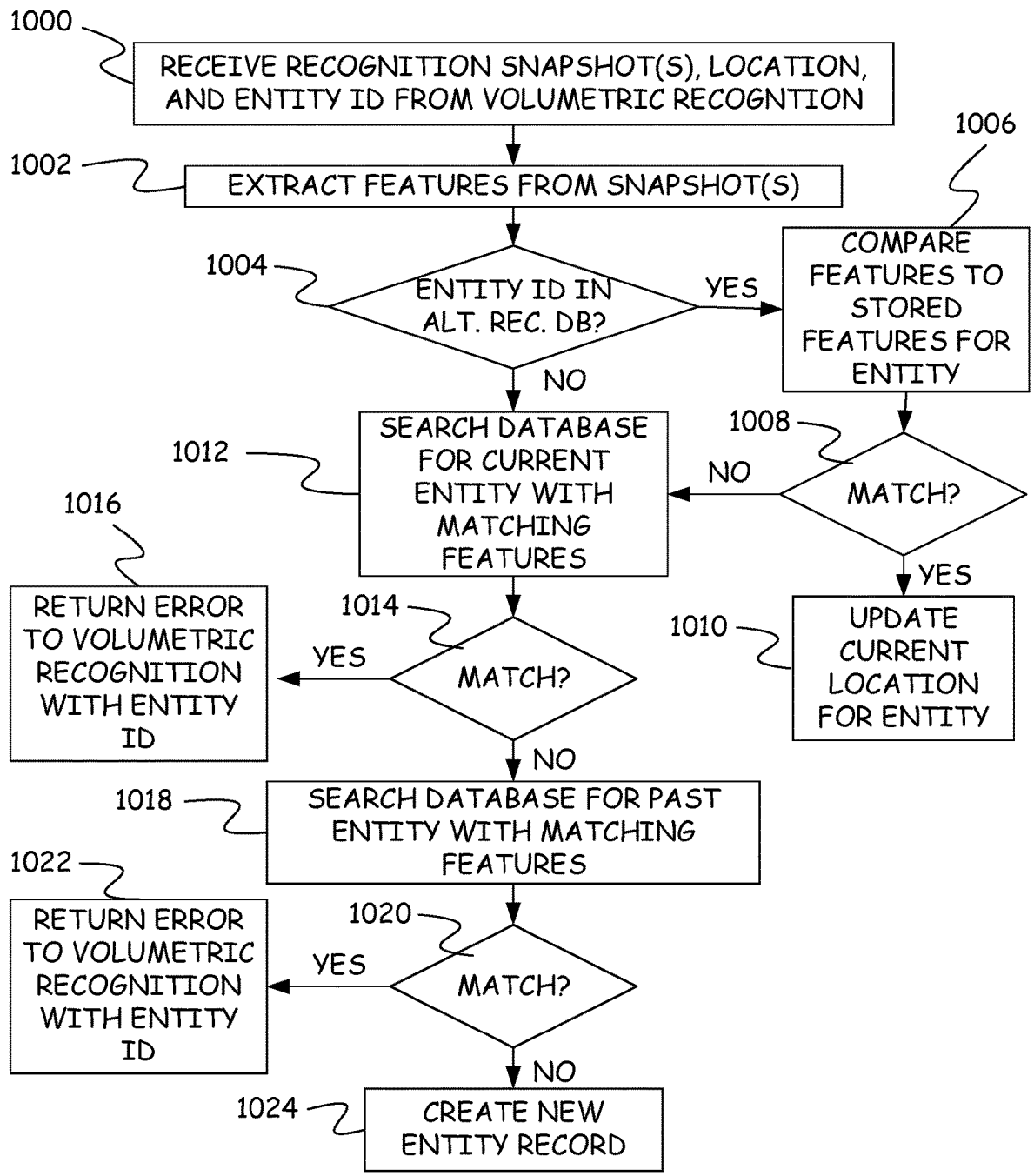
FIG. 10 is a flow diagram of a method of performing alternative pattern recognition in cooperation with volumetric modeling.

FIG. 10 provides a flow diagram of one method of performing an alternative pattern recognition in accordance with one embodiment. In step 1000, alternative pattern recognition engine 122 receives the snapshot(s) 126, entity ID 120 and current location 118 of the entity from volumetric recognition engine 108. At step 1002, a feature extractor 128 extracts recognition features from the snapshot(s) 126. For example, feature extractor 128 will identify clothing features from snapshot(s) 126 when clothing recognition is to be performed.

At step 1004, alternative pattern recognition engine 122 searches for entity ID 120 in Entity ID fields 132 of an entity database 130 that is maintained by alternative pattern recognition engine 122. If the Entity ID is found in database 130, stored recognition features 134 for the found entity are retrieved from database 130 and are compared to the extracted recognition features at step 1006. If the stored recognition features match the extracted features at step 1008, a current location 136 for the entity in database 130 is updated based on the location provided by volumetric recognition engine 108.

If the stored recognition features 134 do not match the extracted features at step 1008 or if the entity ID provided by volumetric recognition engine 108 is not present in entity database 130, alternative pattern recognition engine 122 performs a search 1012 of entity database 130 for an entity that has been determined to be in the building within some recent period of time, such as an hour, and that has stored recognition features 134 that match the extracted features generated by feature extractor 128. In accordance with one embodiment, the search is performed by first examining entities with a current location 136 that is close to location 118 provided for the entity by volumetric recognition engine 108 and then searching entities that have a current location 136 that is far from location 118. Since a matching entity is likely to be close to where volumetric recognition engine 108 says the entity is located, performing this search improves the operation of the computing systems. If such an entity is found at step 1014, the entity identified by volumetric recognition engine 108 is incorrect. To address this error, alternative pattern recognition engine 122 retrieves entity ID 132 for the entity with the matching recognition features 134 and sends the retrieved entity ID 132 and the entity ID provided by volumetric recognition engine 108 in an error message to volumetric recognition engine 108 at step 1016. Alternative pattern recognition engine 122 also updates the current location 136 of the matching entity.

If no entity that has been determined to be in the building in the recent time period matches the extracted features at step 1014, alternative pattern recognition engine 122 performs a search 1018 of the remaining entities in entity database 130 to determine if any people who visited the building in the past have matching features. If a person is found with recognition features 134 that match the extracted features at step 1020, the identity identified by volumetric recognition engine 108 is incorrect. To address this error, alternative pattern recognition engine 122 retrieves entity ID 132 for the entity with the matching recognition features 134 and sends the retrieved entity ID 132 and the entity ID provided by volumetric recognition engine 108 in an error message to volumetric recognition engine 108 at step 1022. Alternative pattern recognition engine 122 also updates the current location 136 of the matching entity.

If no entity with matching recognition features 134 is found at step 1020, alternative pattern recognition engine 122 creates a new entity record in entity database 130 and assigns the location and entity ID provided by volumetric recognition engine 108 to the new entity and assigns the features extracted by feature extractor 128 as recognition features 134.

Returning to FIG. 3, after the alternative recognition has been performed at step 318, volumetric recognition engine 108 corrects any errors identified by alternative recognition engine 122 at step 320. In particular, if volumetric recognition engine 108 incorrectly identified a volume as being one entity when in fact it was another entity, the entity record for the correct entity ID is updated with the current location of the entity.

At step 322, the process determines if there are more volumes to be processed for the current frame. If there are more volumes, the process returns to step 300 and steps 300-322 are repeated. When all of the volumes have been processed at step 322, assistance tasks are performed for the identified people based on their locations and interactions with their environments at step 324.

Figure 11:
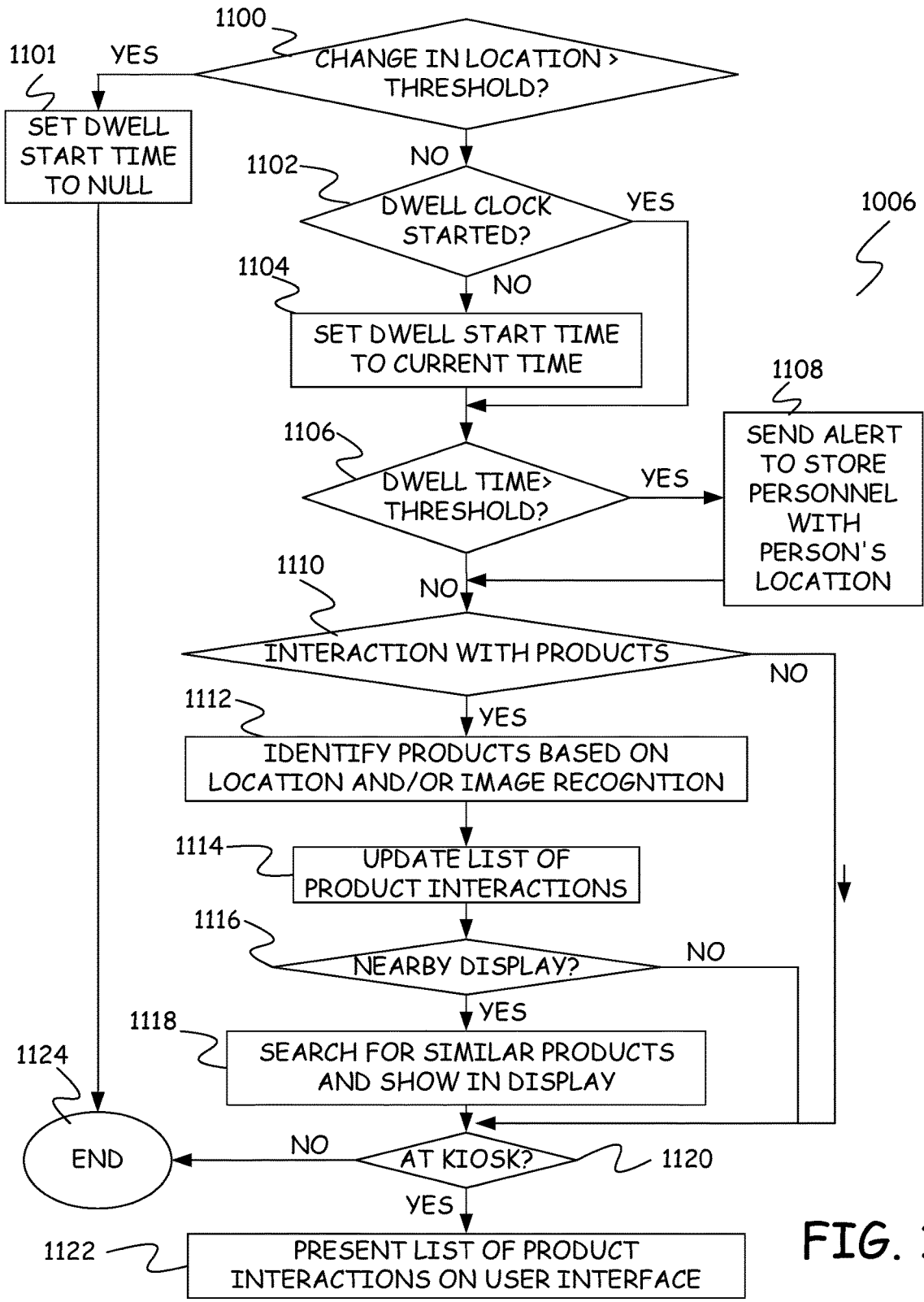
FIG. 11 is a flow diagram of a method of performing assistance tasks using volumetric modeling.

FIG. 11 provides a flow diagram of one method of performing assistance tasks in accordance with a first embodiment. In step 1100, assistance application 150 compares the current location 118 of the entity to the rolling average location 119 to determine if the difference between these locations is large enough to indicate that the person is moving. If the difference is large enough to indicate that the person is moving, a dwell start time 140 for the entity is set to null at step 1101 and the process ends at step 1124. If the difference does not indicate that the person is moving, assistance application 150 determines if a dwell clock has been started by examining dwell start time 140 for the entity in entity database 116 to see if it is non-zero. If a dwell clock has not been started, the current time is stored as dwell start time 140 for the entity at step 1104.

At step 1106, dwell start time 140 is compared to the current time to determine if enough time has passed since the person began to dwell in their current location that assistance should be sent to the person. If the dwell time exceeds the assistance threshold, an alert is sent to store personnel through a user interface on client device 180 along with the location of the person in building 104 so that the store personnel can assist the person.

If the person has not been dwelling enough to require assistance at step 1106 or after the alert has been sent at step 1108, assistance application 150 determines if the person is interacting with products at step 1110 based on the images provided by cameras 102 or other sensors in building 104. If the person is interacting with a product, assistance application 150 identifies the product that the user is interacting with at step 1112 based on the location of the person, the images from cameras 102 or other sensors in building 104. At step 1114, assistance application 150 adds the product that the person is interacting with to a list of product interactions 142 in entity database 116.

At step 1116, assistance application 150 determines if there is an electronic display near the person's location. If an electronic display is near the person, assistance application 150 performs a search for products that are similar to the product that the person is interacting with but that is only available online. Assistance application 150 then provides a user interface to the display 105 in building 104 to display the similar products that are only available online at step 1118. This allows the person to see items that the person is interested in but that are not currently in building 104.

After step 1118 or if the person is not interacting with a product at step 1110 or if there are no electronic displays near the person at step 1116, the process continues at step 1120 where assistance application 150 determines if the user is at a point of sale register/kiosk or a registry kiosk. If the person is at a point of sale register/kiosk or a registry kiosk, assistance application 150 retrieves the list of product interactions 142 for the person and presents the list to the person on a display so that the person can select one or more of the products for purchase or to add to a registry as gift ideas for others at step 1122. If the user is not at a point of sale register/kiosk or a registry kiosk at step 1120 or after step 1122, the process ends at step 1124.

Figure 12:
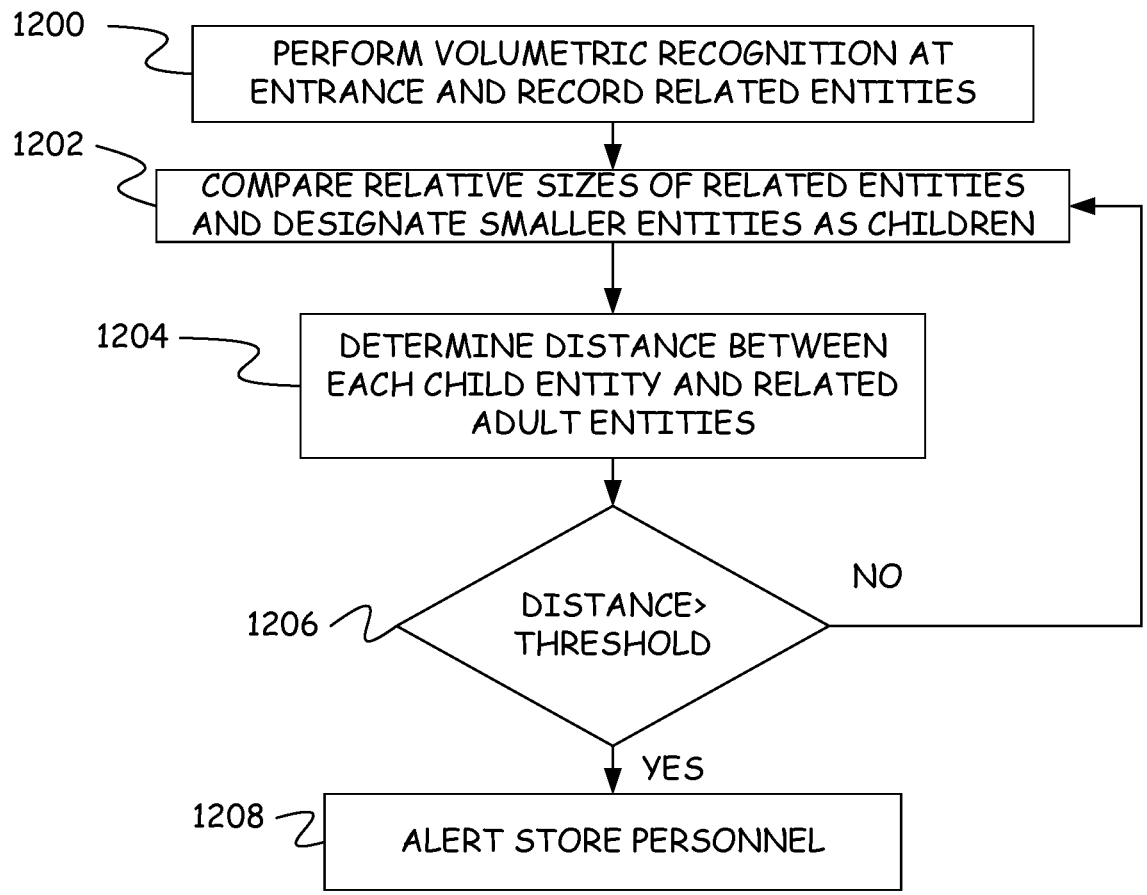
FIG. 12 is a flow diagram of a method of detecting when a child is lost in a store using volumetric modeling.

In accordance with further embodiments, the entities identified by volumetric recognition engine 108 are used by a Lost Child Application 152 to alert employees when a child becomes separated from an adult and to assist employees in finding children who have become separated from an adult. FIG. 12 provides a flow diagram of a method of alerting employees when a child becomes separated from an adult.

In step 1200, volumetric recognition is performed at the entrance to building 104 by volumetric recognition engine 108. During this recognition, entities that enter at the same time time are assumed to be related entities and the record for each of these entities includes a related entities entry 144 that list the entities that are related to this entity. At step 1202, the relative volumes of newly designated related entities are compared to each other and smaller entities are designated as children and larger entities are designated as adults.

At step 1204, the location of each child entity is compared to the locations of the related entities. If the distance between the child and the related adult entities exceeds a threshold at step 1206, an alert is sent to store personnel to go to the child's location at step 1208 because the child may be lost.

Figure 13:
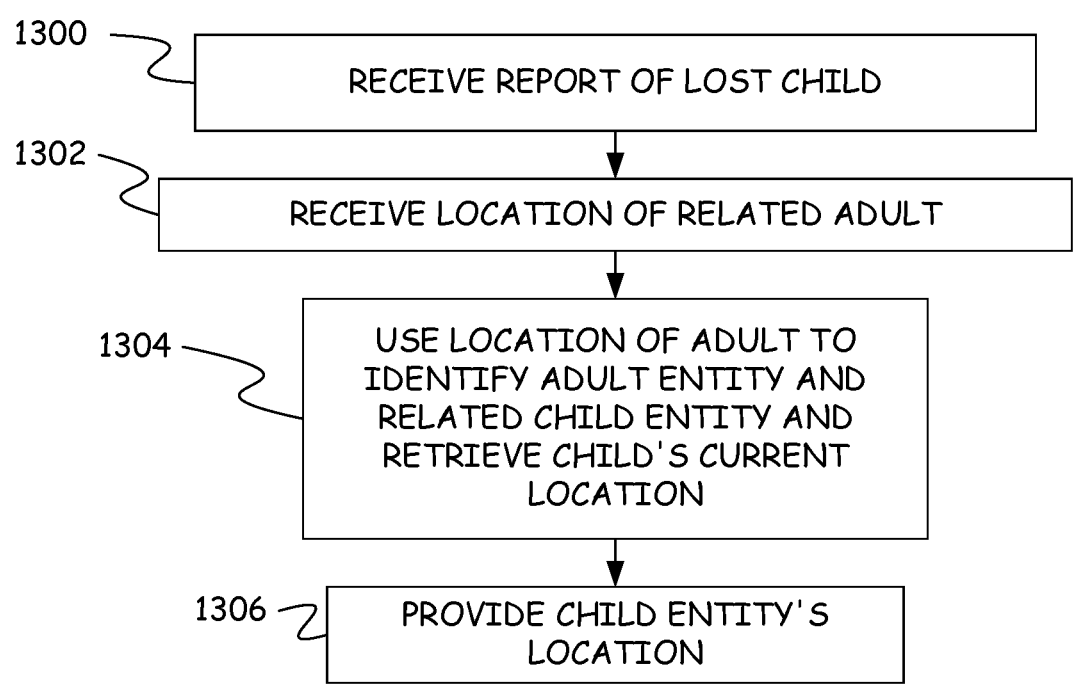
FIG. 13 is a flow diagram of a method of finding a lost child using volumetric modeling.

FIG. 13 provides a flow diagram of a method of using volumetric recognition to find a lost child. At step 1300 of FIG. 13, a report of a lost child is received. At step 1302, a related adult entity is identified. The related adult entity can be identified by store personnel indicating the location of the adult on a map, for example. Based on this location information, volumetric recognition engine 108 finds an adult entry in entity database 116 that has a current location that matches the location of the adult provided by the store personnel. Lost Child Application 152 then retrieves the entity ID of the related child entity from related entities 144 and uses the entity ID to find the record of the child and the child's current location 118 at step 1304. At step 1306, Lost Child Application 152 provides the location of the child to the store personnel through a client device 180.

Figure 14:
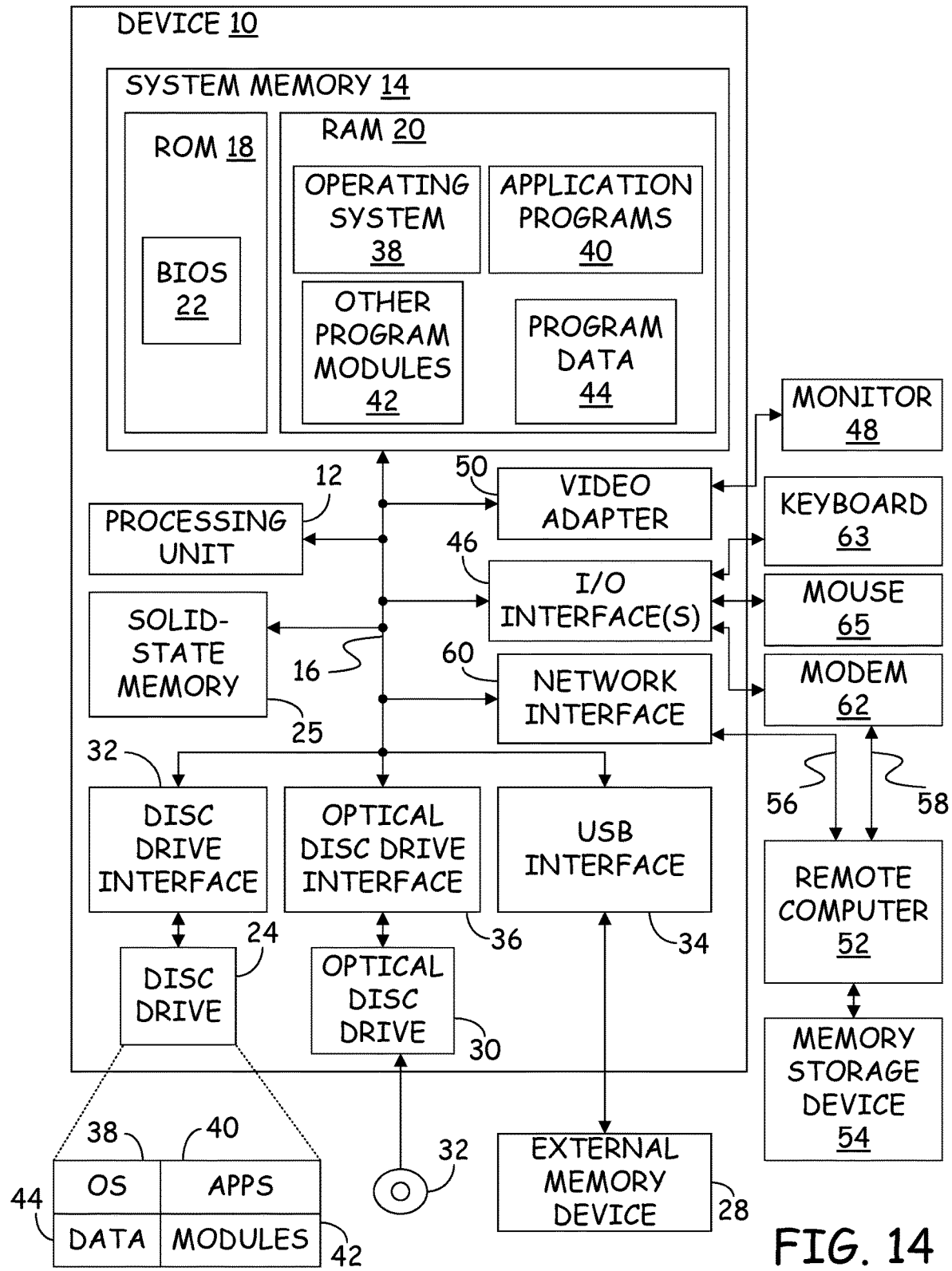
FIG. 14 is a block diagram of a computing device that can be used as a server or client device in the various embodiments.

FIG. 14 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include processes and applications used to perform the operations discussed above, for example. Program data 44 can include all data stored in entity database 116 and entity database 122 as well as 3-D building model 112 and camera parameters 110, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 14. The network connections depicted in FIG. 14 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 14 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
performing volumetric modeling of objects in a space captured by a plurality of cameras to determine which of a plurality of camera images contains an image that facilitates pattern recognition by defining a volume in the space using the plurality of camera images, identifying a portion of the volume that facilitates pattern recognition, and using locations of the plurality of cameras and the identified portion of the volume to determine which camera image facilitates pattern recognition; and
using the camera images that contain an image that facilitates pattern recognition to perform pattern recognition.

2. The computer-implemented method of claim 1 wherein performing volumetric modeling comprises using images captured by the plurality of cameras to identify three-dimensional volumes containing objects in the space that move over time.

3. The computer-implemented method of claim 2 wherein performing volumetric modeling further comprises identifying portions of the three-dimensional volumes that are likely to contain particular body parts.

4. The computer-implemented method of claim 3 wherein performing volumetric modeling further comprises identifying portions of the three-dimensional volumes that are likely to contain a desired view of the particular body parts.

5. The computer-implemented method of claim 4 wherein performing volumetric modeling further comprises determining which camera images contain a portion of a respective three-dimensional volume that is likely to contain the desired view of the particular body parts.

6. The computer-implemented method of claim 5 wherein performing volumetric modeling further comprises, for each camera image that is likely to contain a the desired view of the particular body parts, identifying which portion of the camera image is likely to contain the desired view of the particular body parts.

7. The computer-implemented method of claim 2 wherein using images captured by the plurality of cameras to identify a three-dimensional volume comprises:
dividing the space into three-dimensional blocks;
for each image:
identifying silhouettes of moving objects in the image;
forming a three-dimensional projection in the space based on each silhouette;
determining which of the 3-dimensional blocks are within the silhouette; and
for each 3-dimensional block in the image, adding to a count for the block;
retaining only those blocks with a count above a threshold as object blocks; and
identifying groups of object blocks as three-dimensional volumes.

8. The computer-implemented method of claim 2 wherein for each camera image determined to contain an image that facilitates pattern recognition, providing an entity identifier for a three-dimensional volume captured in the image with the camera image and wherein using the camera images to perform pattern recognition comprises:
obtaining recognition features from a first camera image;
storing the recognition features for the entity identifier provided with the first camera image;
obtaining recognition features from a second camera image containing a three-dimensional volume, the second camera image having the same entity identifier as the first camera image; and
comparing the recognition features from the second camera image to the recognition features from the first camera image and when the recognition features do not match, issuing an error indicating that the wrong entity identifier has been associated with the second camera image.

9. The computer-implemented method of claim 1 wherein performing volumetric modeling of objects in the space further comprises using volumetric models to identify when a child is separated from an adult in the space.

10. The computer-implemented method of claim 1 wherein performing volumetric modeling of objects in the space further comprises determining that a person is dwelling in a location in the space and sending an alert to an employee to assist the person.

11. The computer-implemented method of claim 1 wherein performing volumetric modeling of objects in the space further comprises determining that a person is interacting with a product based on the volumetric modeling and adding the product to a list associated with the person.

12. The computer-implemented method of claim 1 wherein performing volumetric modeling of objects in the space further comprises determining that a person is interacting with a product based on the volumetric modeling and modifying a display in the space to show a product that is similar to the product that the person is interacting with but that is only available online.

13. A method comprising:
receiving an indication from a volumetric recognition system that a new person has been recognized in a space by receiving a previously unused identifier for the new person from the volumetric recognition system;
using at least one camera image used by the volumetric recognition system as input to an alternative recognition system to determine that the volumetric recognition system erroneously identified the person as new and providing an identifier that was previously set for the person by the volumetric recognition system when the person was initially recognized in the space;
wherein the volumetric recognition system uses a plurality of camera images captured by a plurality of respective cameras to identify a volume and wherein using at least one camera image used by the volumetric recognition system comprises:
identifying a portion of the volume that facilitates pattern recognition, and using locations of the plurality of cameras and the identified portion of the volume to determine which camera image facilitates pattern recognition; and
using the camera image that contains an image that facilitates pattern recognition as input to the alternative recognition system.

14. The method of claim 13 wherein the volumetric recognition system uses an octree representation of the space to recognize people in the space and where in the alternative recognition system uses facial recognition.

15. The method of claim 13 wherein identifying a portion of the volume that facilitates pattern recognition comprises identifying a portion of the volume that contains a select body part.

16. A recognition system comprising:
a plurality of cameras distributed throughout a building;
a volumetric recognition system that identifies a person in the building based on intersections of 3-dimensional projections that are generated from images captured by the plurality of cameras and that identifies which of the images captured by the plurality of cameras contains a particular body area of the person by:
identifying a portion of the intersections of the 3-dimension projections that contains the particular body area;
using the locations of the plurality of cameras and the identified portion of the intersections to determine which image contains the particular body area; and
an alternative pattern recognition system that identifies the person using the image identified by the volumetric recognition system as containing the particular body areas.

17. The recognition system of claim 16 wherein the alternative recognition system further trains a model of a person based on images of the person's body areas in images identified by the volumetric recognition system as containing the particular body areas of people.

18. The recognition system of claim 16 wherein the volumetric recognition system uses an octree representation of the building.

19. The recognition system of claim 16 wherein the volumetric recognition system provides an identifier for an identified person and the alternative pattern recognition system corrects the identifier when the volumetric recognition system incorrectly identifies the person.

* * * * *